United States Patent [19]

Strauss

[11] Patent Number: 5,751,746
[45] Date of Patent: May 12, 1998

[54] METHOD FOR MONITORING SERIAL TRANSMISSION OF DIGITAL DATA MESSAGES ON A SINGLE-WIRE MULTIPLEX CONNECTION BETWEEN INTERCOMMUNICATING SIGNAL-PROCESSING DEVICES

[75] Inventor: Klaus Dieter Strauss, Brunswick, Germany

[73] Assignee: Volkswagen AG, Wolfsburg, Germany

[21] Appl. No.: 490,496

[22] Filed: Jun. 14, 1995

[30] Foreign Application Priority Data

Jun. 16, 1994 [DE] Germany ............ 44 21 083.3

[51] Int. Cl.⁶ ........................................... G06F 11/00
[52] U.S. Cl. ........................................ 371/67.1; 371/28
[58] Field of Search ...................... 371/67.1, 68.2,
371/68.1, 71, 48, 5.1; 364/483, 200, 484;
327/97, 315, 77, 78, 332; 375/76, 224,
220, 219, 287, 282, 307; 395/184.01, 185.01;
370/241, 242, 249

[56] References Cited

U.S. PATENT DOCUMENTS

| | | | |
|---|---|---|---|
| 4,710,919 | 12/1987 | Oliver et al. | 370/96 |
| 4,922,493 | 5/1990 | Kase | 371/31 |
| 4,933,869 | 6/1990 | Gareis et al. | 364/483 |
| 5,001,726 | 3/1991 | Kawai et al. | 375/76 |
| 5,052,021 | 9/1991 | Goto et al. | 375/76 |
| 5,124,990 | 6/1992 | Williamson | 371/20.6 |
| 5,323,331 | 6/1994 | Schenk et al. | 364/550 |
| 5,438,289 | 8/1995 | Kan et al. | 327/96 |
| 5,448,595 | 9/1995 | Kaku et al. | 375/345 |
| 5,454,001 | 9/1995 | Nagatani et al. | 371/68.2 |
| 5,459,426 | 10/1995 | Hori | 327/332 |
| 5,499,269 | 3/1996 | Yoshino | 375/257 |
| 5,640,511 | 6/1997 | Botzenhardt et al. | 395/185.1 |

FOREIGN PATENT DOCUMENTS

| | | |
|---|---|---|
| 211194 | 4/1987 | Germany. |
| 3806794 | 7/1990 | Germany. |
| 4122787 | 1/1992 | Germany. |
| 4227207 | 2/1994 | Germany. |
| 9404800 | 3/1994 | WIPO. |

Primary Examiner—Robert W. Beausoliel, Jr.
Assistant Examiner—Nadeem Iqbal
Attorney, Agent, or Firm—Baker & Botts, L.L.P.

[57] ABSTRACT

In data transmission between the unlike signal-processing devices in a motor vehicle, distortion of transmitted data may occur because of sources of disturbance internal and external to the vehicle due to super position of high frequency disturbances in transmitted data as well as due to short circuits or disconnections occurring in the system. To detect such conditions the level of transmitted data messages is compared with predetermined reference-level limits which may lie within and/or without the useful signal level range, e.g., "0" to "1". Detection of error conditions as well as determination of their cause is possible by use of the method.

11 Claims, 3 Drawing Sheets

METHOD FOR MONITORING SERIAL TRANSMISSION OF DIGITAL DATA MESSAGES ON A SINGLE-WIRE MULTIPLEX CONNECTION BETWEEN INTERCOMMUNICATING SIGNAL-PROCESSING DEVICES

BACKGROUND OF THE INVENTION

This invention relates to methods for monitoring serial transmission of digital data messages on single-wire multiplex connections between intercommunicating signal-processing devices to detect error states, such as short circuits, disconnections or high frequency (HF) disturbances.

In the transmission of data between unlike signal-processing devices in a motor vehicle, such as, for example, ignition-, injection-, braking- or transmission-control devices, as well as passenger comfort electronics, transmitted data may be distorted due to superposition on transmitted data of HF disturbances from sources of disturbance internal as well as external to the vehicle, such as transmitting and receiving systems of a mobile radio network, as well as due to short circuits or disconnections occurring in the system. To avoid such erroneous control signals as well as overload of individual components of the system, these transmission errors must be detected and appropriate countermeasures taken.

For this purpose, each signal-processing device must detect data alterations independently and, depending upon the type of disturbance, maintain an unambiguous communication situation by repeating the transmission or by disconnecting any defective circuit parts.

SUMMARY OF THE INVENTION

Accordingly, it is an object of the present invention to provide a method for monitoring serial transmission of digital data messages on a single line multiplex connection between signal processing devices which overcome the disadvantages of the prior art.

Another object of the invention is to provide a method for monitoring serial transmission of digital data on a single logic data line that, in addition to detecting error states, also permits differentiation of the cause of the errors.

These and other objects of the invention are attained by monitoring transmitted data messages in a transmitting signal processor by reading back data messages and comparing the data level of read-back data messages with at least one reference level limit to detect an HF disturbance and with one reference level limit to detect a short circuit and, in a receiving signal-processing device, monitoring transmitted data messages by comparing the data level of transmitted data messages with a reference level limits above and below the useful signal level region, e.g., above "1" and below "0", and as a result of the comparison, generating a status signal relating to transmitted data messages in the signal-processing device.

In a particular embodiment of the invention, the reference-level limits are selected so that they are separated from the required useful signal levels, e.g. "1" and "0", by an amount which is smaller than or equal to one-half the separation between the useful signal levels, e.g., less than or equal to ½.

Since a signal-processing device which is acting as transmitter recognizes the data message that has been transmitted, monitoring of the read-back data message for an HF disturbance preferably is effected by comparison with a reference-level limit which indicates an HF disturbance and is within the useful signal level region.

Each signal-processing device acting as a receiver may, if it does not recognize a transmitted data message, undertake to act as a transmitter. Those signal processing devices monitor for HF disturbances by comparing the data level of transmitted data messages with, in each instance, a reference-level limit lying above and a reference-level limit lying below the useful signal level region. For this reason, even when a signal-processing device is acting as a transmitter, it may be of advantage to monitor for an HF disturbance with a reference-level limit lying above and a reference-level limit lying below the useful signal level region. If one of the two reference-level limits is violated, this will indicate that an inadmissible HF disturbance is superimposed on the transmitted signal level.

Since the particular reference-level limit lying outside the useful signal level region which has the greater spacing from the lower useful level is not needed for the detection of a HF disturbance during transmission of data corresponding to the lower useful level, according to a preferred development of the invention that reference level is reduced to the value of the reference-level limit which indicates a short circuit and used for monitoring for short circuit. If the signal line is normally kept at the high useful level, i.e. a "1", short-circuit monitoring is needed only at a required data level corresponding to the low useful level, i.e. "0" and, in this embodiment, an additional reference-level limit for short-circuit detection can therefore be omitted.

According to another embodiment of the invention, the transmitted data message is subjected to filtering so that superimposed HF disturbances are suppressed and the delivered data message is compared with a reference-level limit indicating a short circuit which is within the useful signal level region.

An existing short circuit may alternatively be differentiated from an HF disturbance in that comparison of the transmitted data message with a reference-level limit indicating a short circuit and lying within the useful signal level region is carried out at least over a period of time in which a superimposed HF disturbance would fall below the reference-level limit. If this does not happen during that time, a short circuit is indicated.

In a data signal level change, for example from the high level to the low level, the data signal does not immediately jump to the other level, but requires a finite time to do this. Therefore, a short-circuit detection could lead to incorrect results during the time in which the data signal remains above the reference-level limit for a short circuit. For this reason, in a further aspect of the invention, monitoring for a short circuit is effected after a delay which corresponds to the minimum period required for the data signal to change from the high level to the low level in order to permit the signal to fall below the reference-level limit which would indicate a short circuit when there is no short circuit. Another possibility for taking this delay into account is to add this minimum period to the minimum signal time required for short-circuit detection.

Disconnection of the data line is detected by the signal-processing devices when no level change take place upon attempted transmission of a data message.

The method according to the invention enables each signal-processing device to detect data alterations independently and, depending upon the type of disturbance, to maintain an unambiguous communication situation in every case by repeating the transmission, not accepting a received message, or by disconnecting any defective circuit parts.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
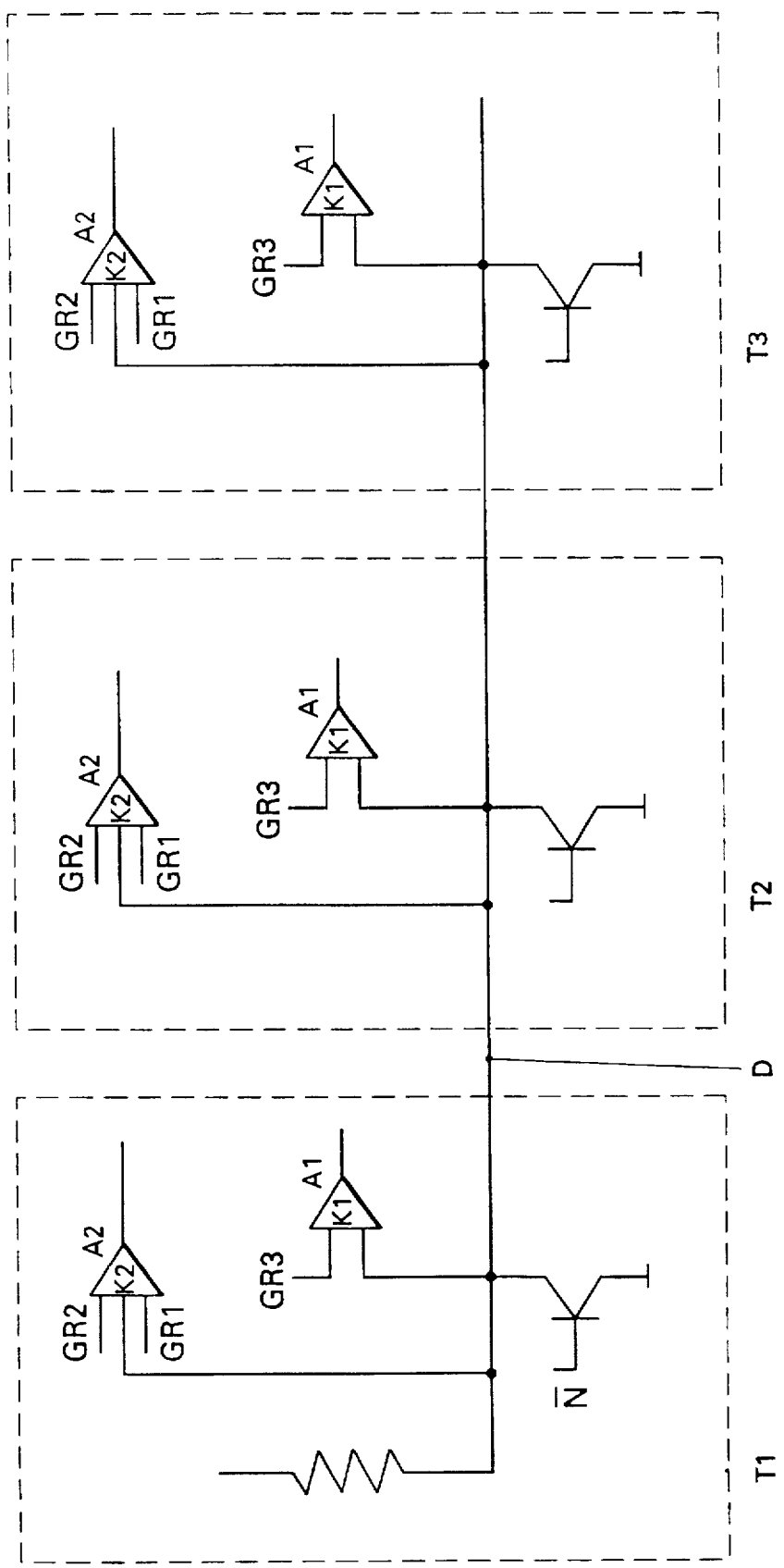
FIG. 1 is a schematic circuit diagram illustrating a representative circuit arrangement for error evaluation at a selected disturbance level.

In the representative circuit arrangement shown schematically in FIG. 1, a communication network includes a variety of electronic control devices T1–T3 connected by a single logic data line. Typical of the control devices T1–T3 for which the invention may be used, for example, are control devices for motor vehicles, such as ignition, injection, braking or transmission control devices, and, alternatively, control devices for passenger comfort electronics. According to one example, a logic data line D, through which the individual control devices T1–T3 transmit or receive data messages $\overline{N}$ from other control devices, is normally kept at useful level "1" (i.e. HIGH). Each transmission begins with transmission of a starting bit "0" (i.e. LOW) along with a synchronization signal to which all receivers are synchronized. If a plurality of the control devices T1–T3 are preparing to transmit data, access to the line D is given in an arbitration phase to the transmitting control device e.g., T1, with information having the highest priority.

In a data transmission network, disturbances in the network a itself, such as short circuits or line disconnections, but alternatively high-frequency fields in the vicinity of the network, may result in data distortions, which may lead to functional disturbances. Therefore, mechanisms must be provided that reliably detect these signal distortions and, depending upon the type of disturbance, maintain unambiguous communication in every case by repeating the transmission or by disconnecting any defective circuit parts. In practice, it is advantageous to monitor every transmitted message at both ends of the transmission path, i.e., in the transmitter as well as in the receiver. In the representative arrangement shown in FIG. 1, the control device T1 is shown as operating as the transmitter of the data message $\overline{N}$ and the control devices T2 and T3 are operating as receivers of the data message $\overline{N}$. After delivery of the data message $\overline{N}$ to the logic data line D, the transmitter T1 reads its data message back from the data line and compares it in a comparator K1 with a reference-level limit GR3 which is within the limits "0" and "1" of the useful signal level range and, in the representative example shown in FIG. 3, GR3 is 50% of the useful level "1". Since the transmitter T1 also receives the delivered data message $\overline{N}$, if the reference-level limit GR3 is violated it can detect an HF disturbance by the transmitted data level of the data message D.

The logic linkage of the inverted data message $\overline{N}$ with the output A1 of the comparator K1 is as follows:

| $\overline{N}$ | A1 | Status |
|---|---|---|
| 0 | 1 | Logic "1" |
| 1 | 0 | Logic "0" |
| 0 | 0 | HF Disturbance |
| 1 | 1 | HF Disturbance |

This shows that, at a high data signal level "1" the detected signal falls below the reference-level limit GR3, and at a low data signal level "0" the detected signal rises above the reference-level limit GR3, indicating that an inadmissible superimposed high-frequency disturbance is present.

In transmission protocols utilizing bitwise arbitration, a situation may occur during the arbitration in which the data message $\overline{N}=0$ can be transmitted and A1=0 can alternatively be generated by simultaneous transmitting operation of two of the control devices T1–T3. Then the transmitter which loses transmitting authority goes into a receiving operation.

In this case, if the control device T1 is transmitting, the control devices T2 and T3, operating as receivers, do not recognize the transmitted data message $\overline{N}$, i.e., do not know whether a data level 0 or 1 has been transmitted. For this reason, they compare the data level of the received data message $\overline{N}$ in each instance with a reference-level limit GR2 lying above the high useful level "1" and with a reference-level limit GR1 lying below the low useful level "0". In the example illustrated in FIG. 2, the reference-level limit GR2 has been defined as 150% and the reference-level limit GR1 as minus 50% of the useful level "1". If the data level of the received data message $\overline{N}$ falls below the reference-level limit GR1 or the reference-level limit GR2 is exceeded, the control devices T2 and T3, operating as receivers, detect a data distortion produced by a high-frequency disturbance.

Another possibility is that the control devices T2 and T3, operating as receivers, additionally perform a comparison of the received data message $\overline{N}$ with the reference level GR3. In that case, a comparison of the output A1 of the comparator K1 and the output A2 of another comparator K2 produces the following linkage, where X represents an undetermined signal level:

| A1 | A2 | Status |
|---|---|---|
| 0 | 0 | 0 |
| 1 | 0 | 1 |
| X | 1 | HF Disturbance |

Figure 2:
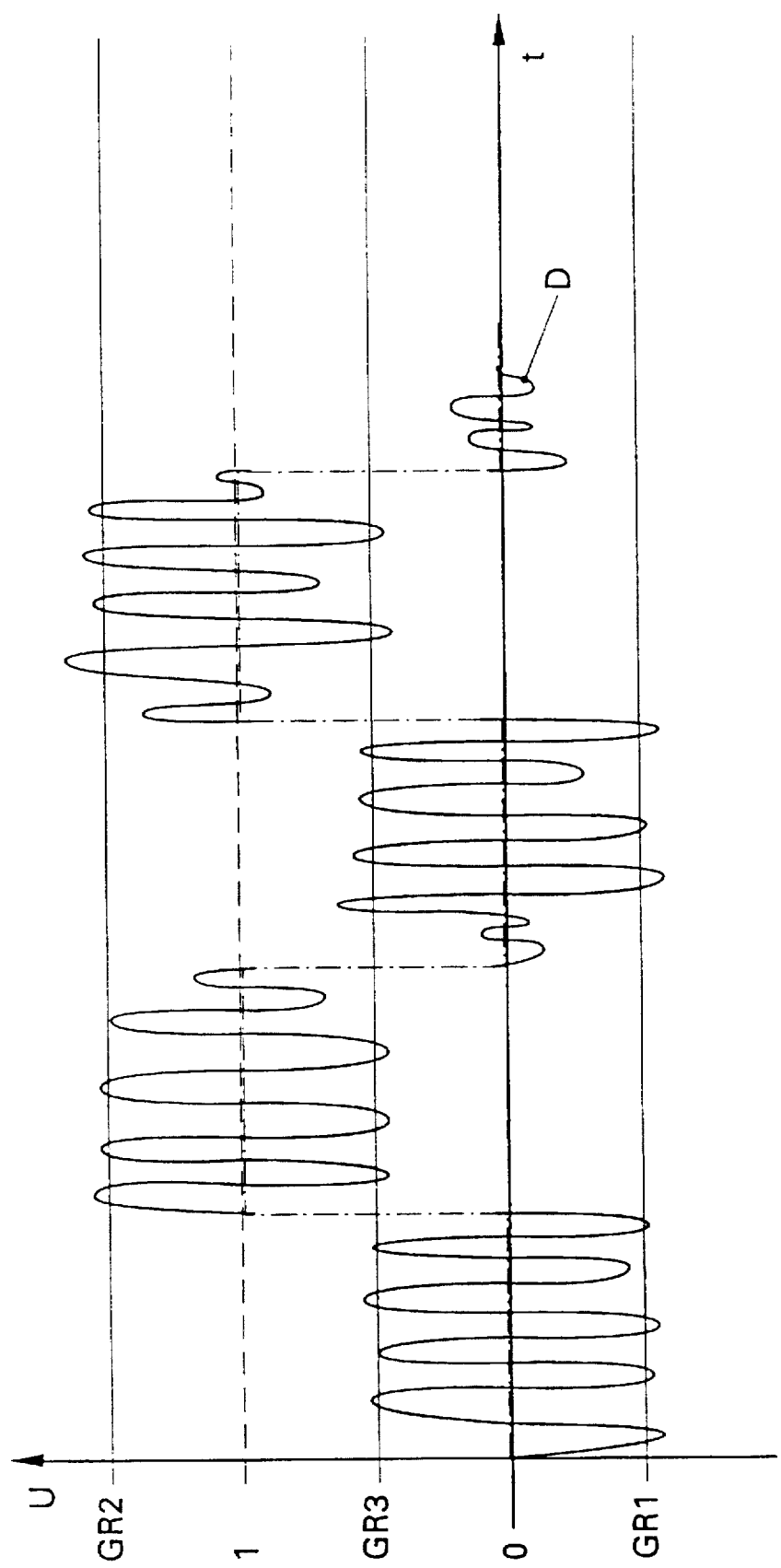
FIG. 2 is a graphical illustration of a transmitted signal when a high-frequency disturbance is present.

For clarification, FIG. 2 shows a transmitted data message $\overline{N}$ with a superimposed high-frequency disturbance.

Figure 3:
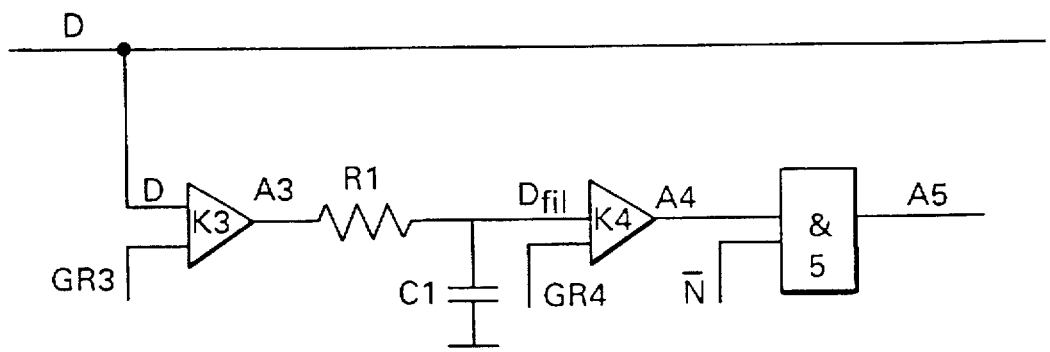
FIG. 3 is a schematic circuit diagram showing a representative circuit arrangement for detection of a short circuit.

Detection of a short circuit in the network is effected according to the described embodiment only in the control device T1 transmitting the data message $\overline{N}$. FIG. 3 shows one possible arrangement of a test circuit integrated in the interface IC. In this test circuit, a comparator K3 compares the inverted data signal on the line D with a reference-level limit for detection of the data level which, for example, is equal to the reference-level limit GR3. In this case, the output A3 of the comparator K3 has a level "1" when the data level of the data line D is greater than the value of the reference-level limit and a level "0" when it lies below the reference-level limit. Following the comparator K3 is an additional comparator K4, which compares the level at the output A3 with another reference-level limit GR4. Short-circuit detection is performed only at the data signal level "0". For this purpose, an AND gate 5 links the output A4 of the comparator K4 with the data message level $\bar{N}$ and generates a level "1" at the output A5 if a short circuit is present.

In order to differentiate the existence of a short circuit from a superimposed HF disturbance, an R-C section containing a resistor R1 and a capacitor C1 is provided in the test circuit between the comparators K3 and K4 to filter out the HF disturbance.

Figure 4:
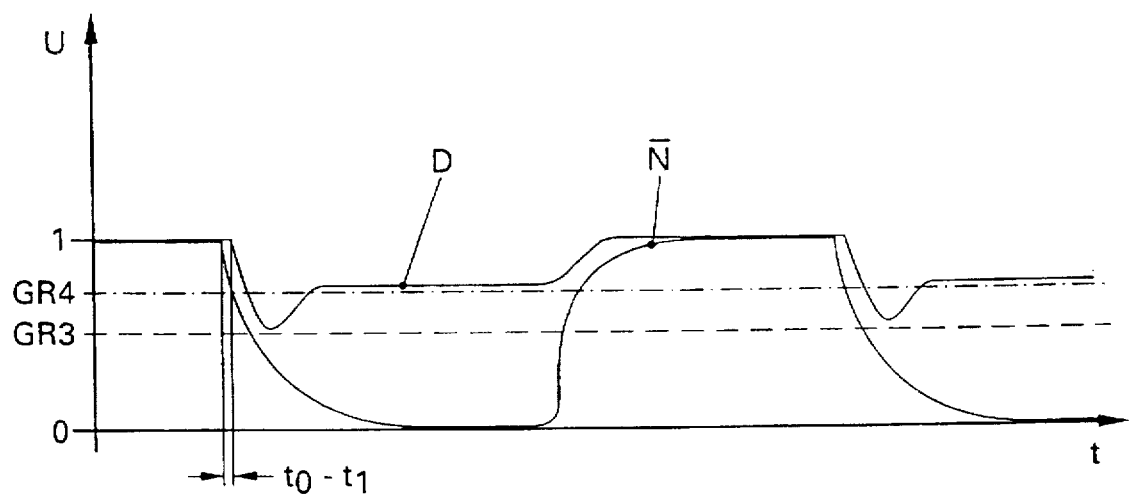
FIG. 4 is a graphical illustration showing a data message with a short circuit present.

The voltage-time relation of a data message $\bar{N}$ in the presence of a short circuit is illustrated in FIG. 4.

To eliminate one of the reference-level limits, the reference-level limit GR4 defining a short circuit condition may be set equal to the reference-level limit GR3.

In monitoring for a short circuit, it must be taken into consideration that, when the signal level of the data message $\bar{N}$ changes, a certain time is necessary before the new level is reached. With a level change from "1" to "0", this may lead to an erroneous short-circuit detection. For this reason, monitoring of a short circuit must take place with a delay or cutout of the time period $t_0-t_1$, shown in FIG. 4.

Figure 5:
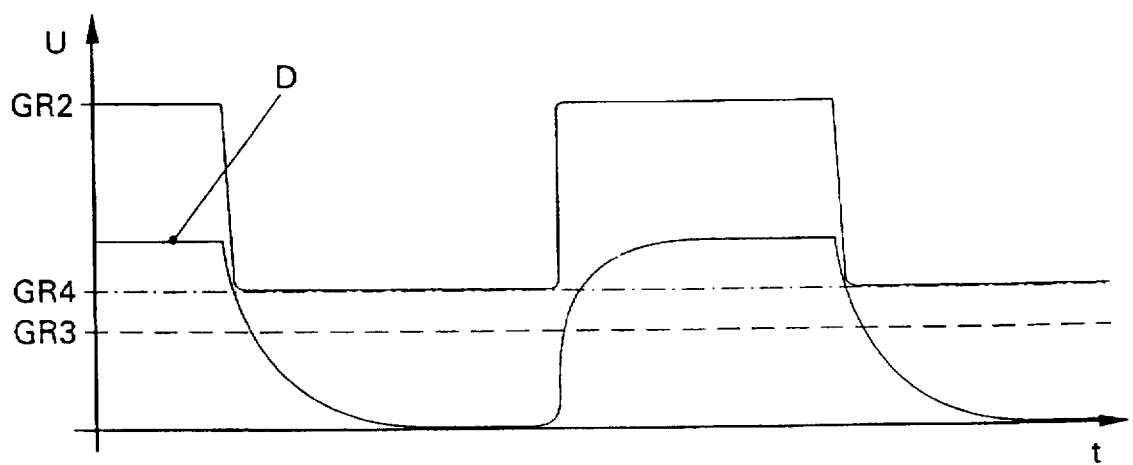
FIG. 5 is a graphical illustration showing a reference-level limit GR2 reduced to the level of another reference-level limit GR4.

Since the reference-level limit GR2 for the detection of a high-frequency disturbance in a control device operating as transmitter as well as in a control device operating as receiver is necessary only at a data level "1", this reference-level limit during a data level "0" may be reduced to the magnitude of the reference-level limit GR4 and used for short-circuit detection. A corresponding voltage-time diagram is represented in FIG. 5.

For common processing and generation of the error messages from several control devices T1–T3 on a single logic data line D, the individual status reports are combined into a single error status report, where the control device operating as a transmitter determines an error status F as a function of a logic linkage of the data message $\bar{N}$, the short-circuit detection signal A5 and the presence of a high-frequency disturbance HF. The following table shows a possible combined logic linkage:

| $\bar{N}$ | A5 Short circuit | A1 or A2 HF disturbance | Error status |
| --- | --- | --- | --- |
| X | 0 | 0 | 0 |
| 0 | 1 | 0 | 0 |
| 1 | 1 | 0 | 0 |
| X | X | 1 | 1 |

Since examination for a superimposed high-frequency disturbance only takes place in the receiver and the signal data level "0" or "1" is unknown, an error status is produced in this case only as a function of the presence of an HF disturbance.

Thus, when only an HF disturbance or only a short circuit is present, a transmitter is able unambiguously to detect which type of error is present.

Although the invention has been described herein with reference to specific embodiments, many modifications and variations therein will readily occur to those skilled in the art. Accordingly such variations and modifications are included within the intended scope of the invention.

I claim:

1. A method for monitoring serial transmission of digital data utilizing a useful signal level range on a single-wire multiplex connection between intercommunicating signal-processing devices for error conditions, comprising providing a single-wire multiplex connection between intercommunicating signal-processing devices, the single wire connection normally being maintained at a selected voltage level, monitoring transmitted data messages in a signal processing device operating as a transmitter by reading back data messages and comparing the data level of the read-back data messages with at least one reference-level limit indicating the presence of a high frequency disturbance and with one reference-level limit indicating the presence of a short circuit and comparing the data level of transmitted data messages in a signal-processing device operating as a receiver with a first reference-level limit located above and a second reference-level limit located below the useful signal level range and generating a status signal concerning the transmitted data messages in the signal-processing devices as a result of the comparison.

2. A method according to claim 1 wherein the levels of the reference-level limits are spaced from the useful signal level range by an amount which is less than or equal to one-half the useful signal level range.

3. A method according to claim 1 wherein the signal-processing device operating as a transmitter monitors the read-back data messages by comparing of the data level of the data messages with at least one reference-level limit indicating a high frequency disturbance which is within the useful signal level range and with one reference-level limit indicating a short circuit which is spaced from the lowest useful signal level by a distance which is greater or smaller than the distance from that useful level of a reference-level limit which indicates a superimposed high frequency disturbance.

4. A method according to claim 1 wherein the signal-processing device operating as a transmitter monitors for a high frequency disturbance superimposed on a data message by comparing of the signal data level with a reference-level limit located above the useful signal level range and a reference-level limit located below the useful signal level range and monitors the data message for a short circuit by comparing the signal level with a reference-level limit located within the useful signal level range.

5. A method according to claim 4 wherein the reference-level limit located outside the useful signal level range which has the greater distance from the lowest useful signal level during transmission of data message level at the lowest useful signal level is reduced to the reference-level limit which indicates a short circuit and is used for short-circuit detection.

6. A method according to claim 1 wherein the transmitted data message is filtered to suppress superimposed high frequency disturbances and the filtered data message is compared with a reference-level limit indicating a short circuit and located within the useful signal level range.

7. A method according to claim 1 wherein the transmitted data message is compared with a reference-level limit indicating a short circuit and located within the useful level region at least over a time period in which a superimposed high frequency disturbance falls below the reference-level limit for detection of the existence of a short circuit.

8. A method according to claim 3 wherein the reference-level limit defining a short circuit is equal to the reference-level limit for detecting a high frequency disturbance which is within the useful signal level range.

9. A method according to claim 3 wherein monitoring of a short circuit is effected utilizing a delay which corresponds to the minimum time period that the data signal requires after a predetermined level change from a high signal level to a low signal level is initiated in order to fall below the short circuit reference-level limit when no short circuit is present.

10. A method according to claim 9 wherein the minimum time period that the data signal requires after initiation of a signal level change from a high signal level to a low signal level in order to fall below the reference-level limit when no short circuit is present is added to the minimum time required for short-circuit detection.

11. A method according to claim 1 wherein disconnection of the single wire connection from the signal-processing devices is detected by the absence of a signal level change when a data message is transmitted.

* * * * *

UNITED STATES PATENT AND TRADEMARK OFFICE
CERTIFICATE OF CORRECTION

PATENT NO. : 5,751,746
DATED       : May 12, 1998
INVENTOR(S) : Klaus Dieter Strauss It is certified that error appears in the above-identified patent and that said Letters Patent is hereby corrected as shown below:

```
       On the title page,
                under "U.S. PATENT DOCUMENTS",
 "4,920,532    4/1990      Wroblewski............370/85.1
  4,063,164    12/1977     Lanz et al.............324/52".
```

Signed and Sealed this

Fourth Day of May, 1999

Attest:

Q. TODD DICKINSON

*Attesting Officer*                 Acting Commissioner of Patents and Trademarks